United States Patent
Kindinger et al.

[11] Patent Number: 5,879,780
[45] Date of Patent: Mar. 9, 1999

[54] LIGHTWEIGHT SELF-SUSTAINING ANISOTROPIC HONEYCOMB MATERIAL

[75] Inventors: James Lee Kindinger; Lori Ann Nusser, both of Pleasanton, Calif.

[73] Assignee: Hexcel Corporation, Pleasanton, Calif.

[21] Appl. No.: 932,699

[22] Filed: Sep. 18, 1997

Related U.S. Application Data

[60] Provisional application No. 60/023,327 Sep. 20, 1996.

[51] Int. Cl.⁶ ....................................................... B32B 3/12
[52] U.S. Cl. ........................... 428/116; 428/118; 428/218
[58] Field of Search ................................... 428/116, 118, 428/218

[56] References Cited

U.S. PATENT DOCUMENTS

| | | | |
|---|---|---|---|
| 5,039,567 | 8/1991 | Landi et al. | 428/116 |
| 5,110,653 | 5/1992 | Landi | 428/116 |
| 5,122,405 | 6/1992 | Landi | 428/116 |
| 5,180,619 | 1/1993 | Landi et al. | 428/116 |
| 5,203,607 | 4/1993 | Landi | 428/116 X |
| 5,284,703 | 2/1994 | Everhart et al. | 428/325 X |
| 5,403,642 | 4/1995 | Landi et al. | 428/116 |
| 5,580,418 | 12/1996 | Alikhan | 428/118 X |
| 5,658,640 | 8/1997 | Berrigan et al. | 428/152 |

*Primary Examiner*—Henry F. Epstein
*Attorney, Agent, or Firm*—Sherman and Shalloway

[57] ABSTRACT

The present invention presents an improved self-sustaining, lightweight honeycomb material made from non-elastomeric, imperforate, air permeable, nonwoven polypropylene or polypropylene/polyethylene blend. The thermoplastic honeycomb material of this invention exhibits anisotropic flexing characteristics providing conformability in three dimensions when flexed. In addition, the honeycomb has improved cushioning, resiliency, squeezability and shape recovery following crush, impact or squeezing. It is energy absorptive, thermally insulative, soft, breathable, compressible, shock absorbent and has low water absorbency making it compatible with moist environments, such as perspiration.

23 Claims, 3 Drawing Sheets

LIGHTWEIGHT SELF-SUSTAINING ANISOTROPIC HONEYCOMB MATERIAL

PRIORITY

This application claims benefit under 35 U.S.C. §119(e) from provisional application No. 60/023,327 filed Sep. 20, 1996.

FIELD OF THE INVENTION

The present invention relates generally to a low density thermoplastic honeycomb material and, particularly to a self-sustaining honeycomb material made from non-elastomeric, imperforate, air permeable, nonwoven thermoplastic material. The thermoplastic honeycomb material of this invention exhibits anisotropic flexing characteristics providing conformability in three dimensions when flexed. In addition, the honeycomb has improved cushioning, resiliency, squeezability, shape recovery following crush, impact or squeezing over prior non-elastomeric honeycomb structures. It is energy absorptive, thermally insulative, soft, breathable, compressible, shock absorbent and has low water absorbency making it compatible with moist environments.

BACKGROUND OF THE INVENTION

Honeycomb panels have heretofore been provided consisting of an array of hexagonal cells made of strips of flat material glued or otherwise bonded together and nested so that each wall of one cell is shared with walls of adjacent cells to provide a structure which, depending on the type of materials used, can vary from being quite rigid to being flexible. Whereas structures of the former type are suitable for making lightweight panels for use in walls, aircraft structures, boat hull structures and other configurations where rigidity, strength and light weight are important considerations, when crushed, these structures exhibit little if any recovery and are thus permanently degraded. In structures of the latter type wherein the honeycomb material is flexible, a cushioning structure can be provided which is resilient and energy absorbing. However, prior flexible honeycombs have been deficient in one or more of the properties of resiliency, squeezability, shape recovery, softness, breathability, water absorbency, conformability, and the like.

Resilient honeycombs are often made from thermoplastic elastomeric strips that are intermittently bonded together at staggered intervals along the length of the strip. Facings are generally applied across the wall edges of the cells to enclose them and maintain the shape of the honeycomb. The thermoplastic elastomeric materials used provide resiliency so that the honeycomb returns to its original shape following deformation. Resilient honeycombs are used for shock absorption and vibration dampening as well as lightweight insulation.

Examples of resilient honeycombs, methods of making and uses therefor include Landi, et al., U.S. Pat. No. 5,039,567, Landi, et al., U.S. Pat. No. 5,180,619, Landi U.S. Pat. No. 5,110,653, Landi U.S. Pat. No. 5,203,607, Landi 5,122,405 and Landi, et al., U.S. Pat. No. 5,403,642. These prior art honeycombs are made from thermoplastic elastomeric materials, such as polyurethane, which are not porous, using a compression bonding method followed by expansion of the bonded stack. At least one facing sheet is required to maintain the honeycomb structure in the expanded state and to encapsulate air within the cells. In the absence of a desire for air encapsulation, a facing sheet or some other means, such as heat flanging, is required to maintain the expanded structure of the honeycomb. These prior art honeycombs rely substantially on the elastomeric nature of the material and encapsulated air within the cells to provide shock absorbency, vibration dampening and shape recovery and, as a result, are denser and stiffer than otherwise desirable, often requiring that they be cushioned with another material, such as a foam layer. They also tend to have a relatively high compressive strength value which makes them harder to conform to a desired shape. When air flow from cell to cell is desired, it is necessary to perforate the elastomeric materials of these patents, as in U.S. Pat. No. 5,180,619 and 5,203,607.

SUMMARY OF THE INVENTION

It is therefore a primary object of this invention to provide a lightweight, low density, resilient and self-sustaining honeycomb.

It is a further object of this invention to provide a lightweight, low density, resilient and self-sustaining honeycomb exhibiting improved properties of conformability, shape recovery, cushioning and resiliency and which absorbs shock and vibration without the need for air encapsulation or facing sheets.

It is a still further object to provide cushioning structures, such as bicycle seats, mattresses, protective padding, and the like, from lightweight, low density, resilient and self-sustaining honeycomb formed from non-elastomeric, imperforate, air permeable, nonwoven substrates of thermoplastic materials and which structures exhibit improved properties of conformability, shape recovery, cushioning and resiliency over previous honeycomb structures and which is compatible with moist environments.

The present invention provides a lightweight, low density, resilient, energy absorbing, self-sustaining, anisotropic honeycomb formed from non-elastomeric, imperforate, air permeable, nonwoven substrates of thermoplastic material bonded to each other to form hexagonal cells, the honeycomb having a density of less than 8 lb/ft$^3$, and particularly less than 5 lb/ft$^3$.

In a preferred embodiment, the invention provides a self-sustaining lightweight, resilient, energy absorbing honeycomb having anisotropic flexing characteristics, improved shape recovery following crush, impact or squeezing, improved cushioning ability and repetitive compressibility, the honeycomb being formed from a non-elastomeric, imperforate, air permeable, nonwoven substrate of polypropylene, or a polypropylene/polyethylene blend, having a weight of from 2 to 3 oz/yd$^2$, the honeycomb having hexagonal cells of from ¼ to ½ inch cell size, a density of from 1 to 3 lb/ft$^3$ and a crush strength of less than 12 psi.

The present invention also provides specific cushioning structures from these energy absorbing honeycomb materials.

Further objects and advantages will be evident from the following drawings and description.

DETAILED DESCRIPTION OF THE INVENTION

Figure 1:
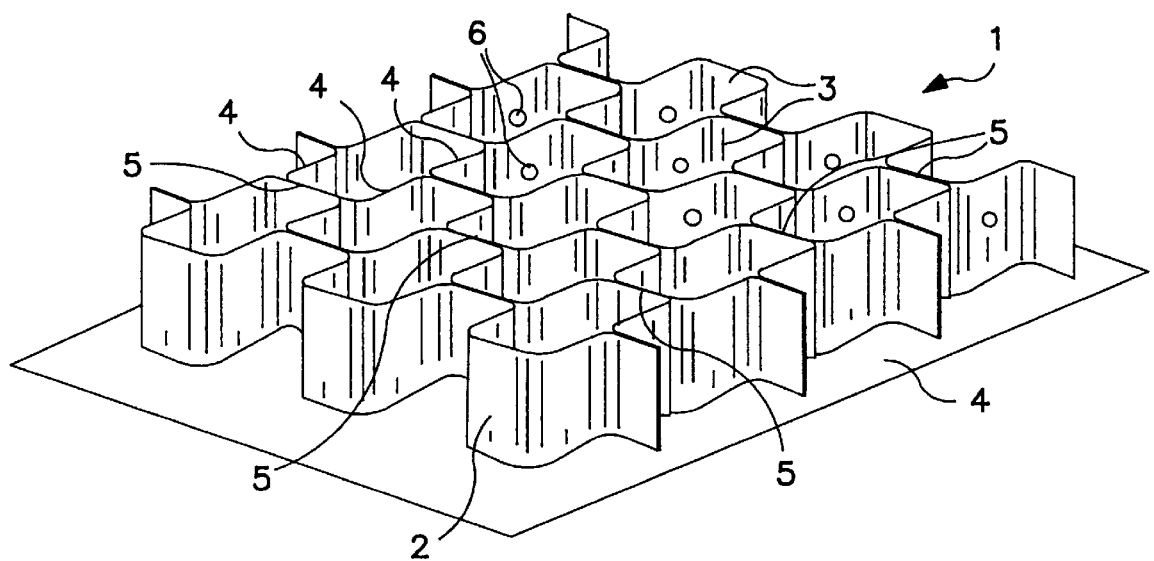
FIG. 1 is a perspective view of the honeycomb of the prior art formed from thermoplastic elastomeric materials using the compression and expansion method.

Referring now to the drawings, FIG. 1 shows a honeycomb-like structure 1 according to the teachings of the prior art which is made from thermoplastic elastomers, such as polyurethane. Such structures are made of strips 2 of the thermoplastic material laid and bonded together then expanded to form the cells 3 of the structure. To hold the expanded shape, generally at least one facing sheet 7 is bonded across the cells 3. Each cell 3 is formed in part by four generally S-shaped wall segments 4 each of which is shared with an adjacent cell. The bonded areas 5 are offset in each row and comprise a double thickness of the thermoplastic elastomeric material. Inasmuch as the thermoplastic elastomeric material of the prior art is non-porous, the cells 3 tend to encapsulate air within them especially when the honeycomb-like structure is bonded between two facing sheets 7. In those instances where air flow between the cells is desired, it is necessary to perforate the strips 2 so that the wall segments 4 of adjacent cells 3 are provided with apertures 6 for air flow.

Figure 2:
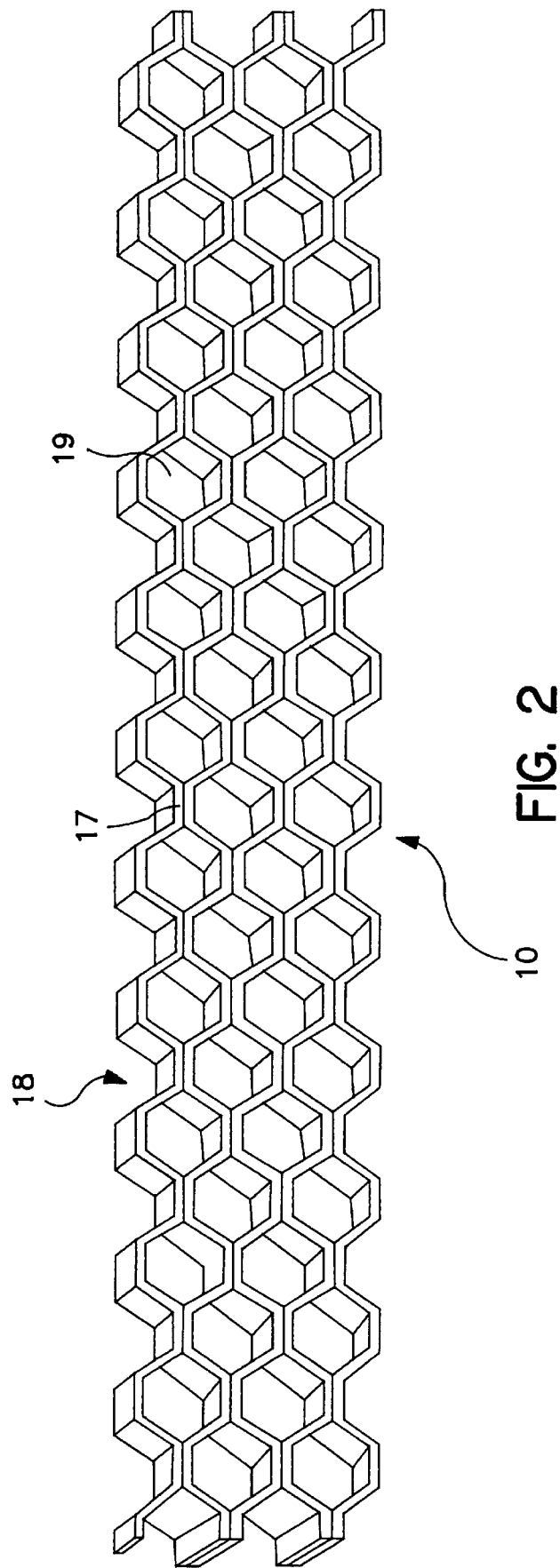
FIG. 2 is a perspective view of the hexagonal honeycomb of the present invention.

In the present invention, a self-sustaining honeycomb 10, FIG. 2, is produced from thermoplastic materials using a continuous manufacturing process wherein successive sections of a non-elastomeric, imperforate, air permeable, non-woven thermoplastic substrate are laid down and formed over hexagonal shaped fingers and bonded to the immediately preceding section by hot air fusion. The resulting honeycomb structure does not require expansion or a facing sheet to maintain its three dimensional cellular arrangement and is therefor self-sustaining. Such a process is disclosed in U.S. Pat. No. 5,139,596, Fell and in U.S. Pat. No. 5,217,556, Fell, both assigned to Hexcel Corporation, the assignee herein, and incorporated herein in their entireties by reference.

Figure 3:
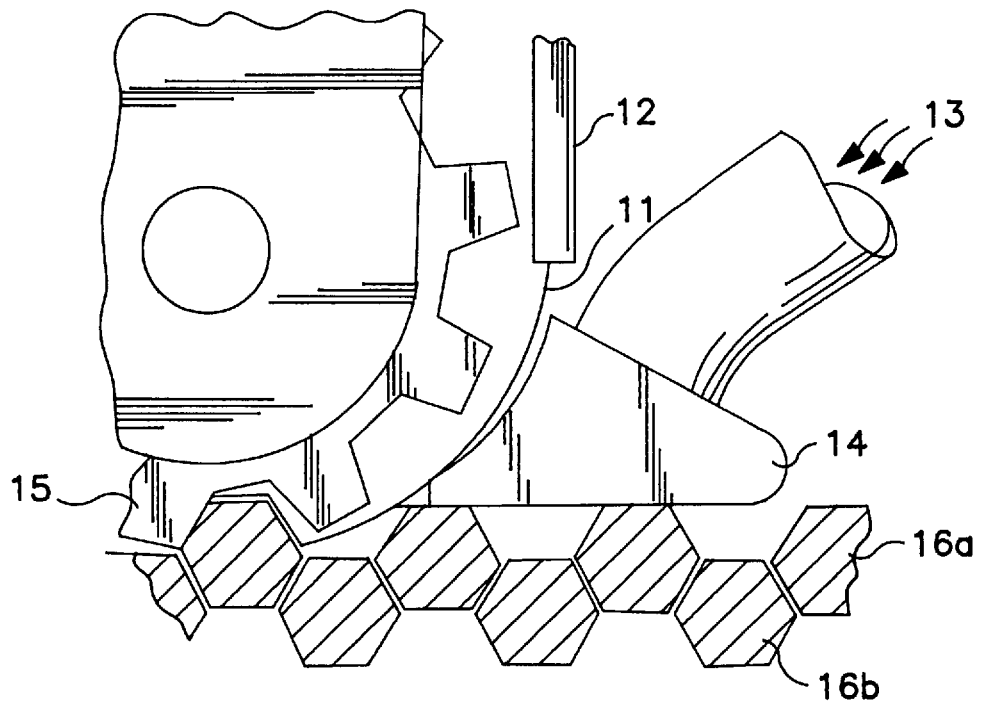
FIG. 3 is a side view of the forming and hot air fusion apparatus used in the manufacturing of the honeycomb of the present invention.
Figure 4:
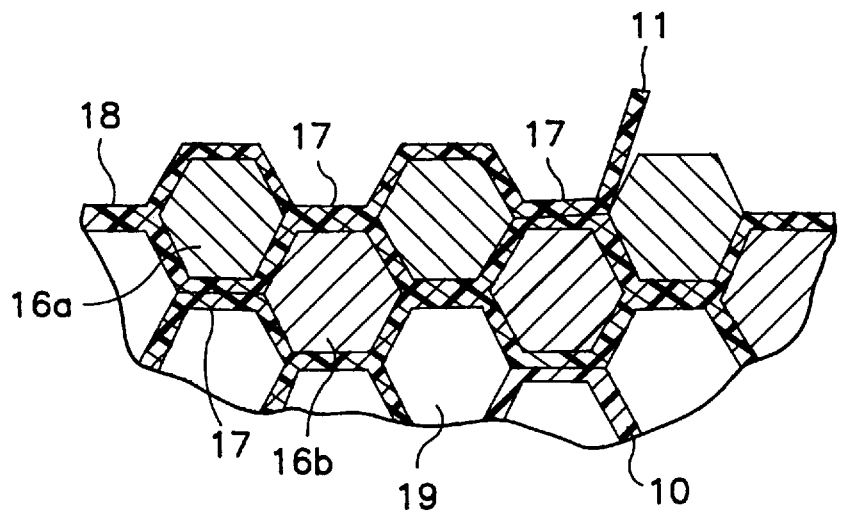
FIG. 4 illustrates the relationship of the layers of web as they are laid down and formed in the manufacture of the honeycomb of the present invention.

As shown in FIG. 3, this process simultaneously heats, corrugates and bonds a continuous substrate of thermoplastic material to produce a hexagonal cell honeycomb which requires no facing sheets to maintain its structure and is, thus, self-sustaining. In the process, a continuous substrate of thermoplastic material 11 is supplied through a guide 12 and is heated by hot gas 13 directed through a nozzle 14 which immediately precedes the substrate 11 as it is delivered to the corrugating roller 15. The roller travels horizontally across and cooperates with hexagonal fingers 16a and 16b to form the heated substrate and bond it to the previously formed layer with the bonding occurring by heat fusion at vertically adjacent cell walls. FIG. 4 illustrates successively bonded layers of the continuous substrate 11 which make up the honeycomb 10. The temperature of the hot gas and the speed of the roller travel are variable based on the material being used. However, for the present invention the gas is preferably air at a temperature of from 400° to 600° C. and the roller travel speed is preferably from 5 to 7 inches/second.

In accordance with the method set forth in the Fell patents, as each layer of substrate is formed and bonded, the lower set of fingers 16b is withdrawn from the completed cells 19 and repositioned over the just-formed layer within the half-cells 18 to serve as formers for the next layer of substrate 11 while what was the upper set of fingers 16a now becomes the lower set to cooperate with the teeth of the corrugating roller 15 for bonding the next formed layer of substrate 11 to the previous layer.

In this manner, the honeycomb 10 is produced in successive layers and as fully formed cells 19 without requiring expansion. Furthermore, due to the heating and corrugation, the thermoplastic material is molded to the hexagonal shape so that the honeycomb is self-sustaining and holds its shape without the need of a facing sheet being bonded across the cells 19. Simultaneously, the hand or softness of the thermoplastic substrate material enhances the resilient structure of the honeycomb.

The self-sustaining characteristic of the honeycomb enables it to retain its shape and cushioning properties without the requirement of a facing sheet or other stiffening means which has a tendency to restrict the conformability of flexible honeycomb structures. Thus, the honeycomb of the present invention has the ability to conform to any surface against which it may be placed or to any object which may be placed upon it. In addition, the absence of a facing sheet improves the shock absorbency and vibration dampening properties of the honeycomb by providing a structure which is freely and anisotropically conformable without any transverse resistance or elastomeric resilience.

Elastomeric honeycombs of the prior art have a tendency to first cushion a shock then produce a rebound or recoil. This is particularly the case where a facing sheet is applied across at least one surface of the honeycomb. The facing sheet creates a transverse or elastomeric resistance across the cells of the honeycomb in the manner of a drum head or a trampoline. Thus, a shock applied to such a honeycomb structure is first cushioned, then rebounded or redirected outward from the honeycomb. Although mechanical perforation of the cell walls and the facing sheet permits cell-to-cell air flow, the facing sheet still traps a certain amount of air within the cells to produce the cushioning and rebound effect. In addition, the facing sheet adhered to the edges of the cells restricts the transverse expansion of the cells to not more than the elastomeric elongation of that portion of the facing sheet spanning each cell. This has the effect of limiting the flexibility of the honeycomb.

In the case of elastomeric honeycombs which are manufactured without a facing sheet, some other means must be employed to maintain the expanded structure. Typically, heat flanging is employed wherein a heated platen is applied to the face of the expanded honeycomb causing the end edges of the cells to melt and flange over. Although this procedure does not close the ends of the cells, it does have the effect of stiffening the overall honeycomb structure so that it remains expanded. The stiffening resulting from heat flanging is similar to forming a stronger elastomer bead along the edge and has an effect on the degree of conformability and resiliency of the honeycomb in that the flanged edge has a reduced flexibility relative to the overall structure and requires a greater force to overcome the extra stiffness. Furthermore, since the unbonded cell walls tend to be thinner and more flexible than the bonded walls, the flanging is likewise thinner with the result that deformation of the cells is uneven with the bonded edges tending to bunch up rather than flexing. This results in a lesser degree of conformability and an uneven amount of flexibility over the horizontal dimensions of each cell. Thus, just as with a facing sheet, the thickening of the cell edges in heat flanged honeycombs causes a reduction in the degree of conformability, resiliency and cushioning of elastomeric honeycombs.

In contrast, the honeycomb of the present invention, being self-sustaining and formed from non-elastomeric, imperforate, air permeable, nonwoven thermoplastic substrates, does not require a facing sheet, flanging or other means to hold its shape, thus minimizing or eliminating transverse resistance to deformation and conformability of the individual cells and the honeycomb as a whole as well as any uneven flexibility caused by bunching of flanged edges. Furthermore, the absence of a facing sheet or flanged edges permits the honeycomb to receive a shock from any direction and to absorb and dissipate that shock, spreading it across adjacent cells, without any rebound or outward redirection of the energy of the shock.

Applying this method to porous nonwoven thermoplastic materials, it has been found that a lightweight self-sustaining honeycomb having improved anisotropic flexing characteristics, shock absorbency, shape recovery, conformability, cushioning ability and repetitive compressibility is produced. The resultant honeycomb is particularly useful for situations where soft cushioning is required for extended periods of time and where concurrent shock resistance and absorption are required, such as in cushions, bicycle seats, mattresses, medical devices, trauma protection, protective padding, springs, packaging and toys. The honeycomb also provides virtually unlimited conformability to surfaces on which it is placed or which are placed against it. In such uses the honeycomb of this invention may be used alone or in combination with other materials such as textile coverings, open or closed cell foams, other honeycombs such as heat flanged polyurethane honeycomb, or the like.

Although any number of thermoplastic materials may be used in the manufacture of a self-sustaining honeycomb, the honeycomb of the present invention exhibiting the improved properties is characterized by being produced from a non-elastomeric, imperforate, air permeable, nonwoven, thermoplastic substrate. Preferred materials from which the honeycomb of the present invention are made are spunbonded polypropylene and blends of polypropylene with other polymers. In particular, a non-elastomeric, imperforate, air permeable, spunbonded polypropylene having a weight of from 2–3 oz/yd$^2$, such as that available from the Veratec division of International Paper, Walpole Mass., under the product name Veraspun, can be formed into the honeycomb of the present invention. As a blended material, a 2–3 oz/yd$^2$, non-elastomeric, imperforate, air permeable, spunbonded polypropylene/polyethylene, such as Freudenberg 2534, available from Freudenberg Nonwovens of Lowell, Mass., has been found suitable. As an alternative thermoplastic material, Freudenberg's Nylon 2588, which is a spunbonded blend of nylon 6 and nylon 6.6, may also be used, although the polypropylene and polypropylene/polyethylene are preferred.

In the case of the polypropylene/polyethylene blended material, Freudenberg 2534, is a preferred starting material. Freudenberg 2534 is a nonwoven blend of about 50% polypropylene and about 50% polyethylene having a weight of 2–3 oz/yd$^2$, particularly about 2.2 oz/yd$^2$, a thickness of from about 7 to about 13 mil and a tensile strength of about 25 to about 50 lbs. The air permeability of this material is from about 100 to about 200 cfm/sft, preferably about 150 to about 200 cfm/sft, and particularly about 175 cfm/sft.

In the case of nonwoven polypropylene, preferred starting materials include Veratec's Veraspun spunbonded polypropylene in weights of about 2–3 oz/yd$^2$, such as, 2.0 oz/yd$^2$ and 2.5 oz/yd$^2$. Veraspun 2.0 oz/yd$^2$ polypropylene is characterized by a thickness of from about 15 to about 22 mil, a tensile strength of about 25–50 lbs, and an air permeability of from about 150 to about 250 cfm/sft, particularly about 210 cfm/sft. Veraspun 2.5 oz/yd$^2$ polypropylene is characterized by a thickness of from about 17 to about 24 mil, a tensile strength of about 25–50 lbs, and an air permeability of from about 150 to about 250 cfm/sft, particularly about 155 cfm/sft.

Other alternative thermoplastic materials which may be provided as non-elastomeric, imperforate, air permeable, nonwoven substrates for use in manufacturing honeycombs having the improved characteristics of the present invention include polyolefins, such as polymers and copolymers of ethylene, propylene, butene and mixtures or blends thereof; aliphatic polyamides, such as nylon 6, nylon 6.6, nylon 6.12, nylon 4, nylon 12 and mixtures and blends thereof as in Freudenberg's Nylon 2588; polyesters, such as polyethylene terephthalate, polybutylene terephthalate, and the like. These materials may be formed into nonwoven substrates by any of the known methods. For example, the thermoplastics may be air layered, needled, spunbonded, or the like, to form non-elastomeric, imperforate, air permeable, nonwoven substrates which may then be formed into the self-sustaining honeycomb of the present invention.

A particular characteristic of the substrates from which the honeycomb is formed is that they be air permeable without physical or mechanical perforation. The air permeability of the substrates allows the honeycomb to breath and contributes to compressibility, deformability and shape recovery without any weakening of the substrate or honeycomb structure caused by physical perforation. In addition, the nonwoven material used herein should not be calendared so as to avoid undue stiffening of the substrate and reduction of air permeability as this adversely affects the resilient structure and flexibility of the honeycomb especially through the length of the cells. Air permeability of the substrate is preferably in the range of from about 100 to about 250 cfm/sft, measured under standard room conditions of 65°–70° F. and 50–55% relative humidity.

In one embodiment, the honeycomb is manufactured from a substrate of nonwoven material, such as, polypropylene or polypropylene/polyethylene blend, which is embossed prior to being formed and bonded. Such embossing has a modifying effect on the hand of the substrate material, enhancing its softness and drape. This, in turn, enhances both the resilient structure of the honeycomb produced from the embossed substrate and its conformability, resulting in a softer self-sustaining structure with a higher degree of flexibility and conformability than that generally obtained without embossing. The pattern of embossing is preferably regular and orderly, rather than random, and should not perforate the substrate. Embossing may be applied to one or both sides of the substrate. A preferred pattern of embossing consists of diagonal parallel rows of small, square indentations. The angle of the rows is about 45° relative to the linear edge of the substrate and the size of the indentations is about 1/32 inch square with a spacing between indentations of 1/32 inch to 1/16 inch. When the embossed pattern is applied to both sides of the substrate, it is preferred that the pattern embossed on one side be in registration with the pattern embossed on the other side. However, it is within the scope of this invention to apply embossing to both sides such that the patterns are not in registration with each other. Regardless of the manner and pattern of embossing, it should not perforate the material.

The honeycomb of the present invention has the advantages of being conformable in three dimensions; it is light weight, breathable, resilient, compressible, deformable, flexible, squeezable and provides both cushioning and energy absorption; it is bendable to 360° and recovers its shape after impact, deformation, compression or squeezing; it is soft, it can be rolled into coils or formed into springs of various compressive resistances and it is compatible with moist environments. These properties are in part attributable to the anisotropic nature of the three dimensional honeycomb structure which has varying degrees of flex along its width, length and thickness dimensions.

In its physical properties, the honeycomb is characterized by a melting point of from about 115° C. to about 165° C., its thermal conductivity is about 0.06–0.10 W/m-°K, its compressive, or crush, strength is <25 psi and it has a density of less than 8 lb/ft$^3$, preferably less than 5 lb/ft$^3$, and most preferably about 1–3 lb/ft$^3$ for cells of from about ¼ to about ½ inch.

The preferred forms of the honeycomb of the present invention are set forth in the following examples. For these examples core density, in lb/ft$^3$, was calculated on samples of at least 12"×12" (preferably 20–24"×20–24") square and 0.5–0.65 inch thick using the following formula:

$$3.81 \times weight/(length \times width \times thickness)$$

where the weight of the sample is measured in grams to the nearest 0.01 gram, thickness is measured to the nearest 0.001 inch, and length and width are measured to the nearest 0.01 inch. For measuring the crush strength of the honeycomb, a minimum of three samples of at least 3"×3" and a thickness of at least 1 inch were tested in an Instron 4210 crush test apparatus under ASTM C 365-94 Flatwise Compressive Properties of Sandwich Cores, and/or, MIL-STD-401B-Paragraph 5.1.4 Core Compression standards, at a crosshead speed of 1.00±0.1 inch per minute and test temperature tolerance of ±10° F., until the specimen bottomed out. The load measuring system was verified in accordance with ASTM E4 and had an accuracy of ±1% of the actual calibrated load. The compressive crush strength $\sigma_{cr}$ was calculated using the formula:

$$\sigma_{cr} = P/A$$

where $\sigma_{cr}$ compressive crush strength, psi,

P=average crush load, lbs,

A=specimen area, in$^2$.

EXAMPLE 1

A hexagonal cell honeycomb was made according to the method set forth in the above-referenced Fell patents at a hot air temperature of 540° C. and a roller travel speed of 6.0 in/sec from a non-elastomeric, imperforate, air permeable, nonwoven substrate of Freudenberg 2534 polypropylene/polyethylene blend having a fabric weight of about 2.2 oz/yd$^2$, a thickness of about 8–10 mil and an air permeability of about 175 cfm/sft. The resulting honeycomb, with a ¼ inch cell size exhibited a core density of 1.9 lb/ft$^3$ and an average compressive crush strength of 5 psi for a specimen having a thickness of 1 inch. Overall, the range of crush strength for honeycomb having a ¼ inch cell size produced from the polypropylene/polyethylene blend was 2–9 psi for specimens having a 1 inch thickness. The honeycomb was self sustaining without a facing sheet and was fully conformable, resilient, compressible, flexible and squeezable, and recovered its shape following impact deformation, compression or squeezing.

EXAMPLE 2

A hexagonal cell honeycomb was made according to the method set forth in the above-referenced Fell patents at a hot air temperature of 460° C. and a roller travel speed of 6.0 in/sec from a non-elastomeric, imperforate, air permeable, nonwoven substrate of Veraspun polypropylene having a fabric weight of about 2.5 oz/yd$^2$, a thickness of from 19 to 23 mil and an air permeability of about 155 cfm/sft. The resulting honeycomb, with a ¼ inch cell size exhibited a core density of 2.1 lb/ft$^3$ and an average compressive crush strength of 7 psi for specimens having a thickness of 1 inch. A similar honeycomb having a 1 inch cell size exhibited a core density of 1.2 lb/ft$^3$. In each instance the honeycomb was self sustaining without a facing sheet and was fully conformable, resilient, compressible, flexible and squeezable, and recovered its shape following impact deformation, compression or squeezing.

EXAMPLE 3

A hexagonal cell honeycomb was made according to the method set forth in the above-referenced Fell patents at a hot air temperature of 420° C. and a roller travel speed of 6.5 in/sec from a non-elastomeric, imperforate, air permeable, nonwoven substrate of Veraspun polypropylene having a fabric weight of about 2.0 oz/yd$^2$, a thickness of about 18–19 mil and an air permeability of about 210 cfm/sft. The resulting honeycomb, with a ¼ inch cell size exhibited a core density of 1.8 lb/ft$^3$ and an average compressive crush strength of 3 psi for specimens having a thickness of 1 inch. The honeycomb was self sustaining without a facing sheet and was fully conformable, resilient, compressible, flexible and squeezable, and recovered its shape following impact deformation, compression or squeezing.

Although the physical properties of the honeycomb itself may be tailored according to the weight of the base material and the size of the cells, the properties of a final product made from the honeycomb of the present invention may also be dictated by combining layers or sections of honeycombs having different densities and crush strengths without sacrificing the conformability, flexibility, resiliency, cushioning and energy absorbent properties of the underlying honeycomb. Also, such combination honeycombs produced according to this invention may be used with or without additional foam layers.

In a particular embodiment, the honeycomb of Example 1, when cut and formed as a bicycle seat pad, has good feel and holds up well under extended use without fully compressing to the point of providing no cushioning or shock absorbency.

The above embodiments and drawings illustrate the preferred embodiments of the present invention and it is understood that many variations and modifications of those embodiments will be evident to those skilled in the art and may be carried out without departing from the spirit and scope of the present invention.

What is claimed is:

1. A self-sustaining, lightweight, resilient, energy absorbing, compressible, anisotropic honeycomb formed from non-elastomeric, imperforate, air permeable, nonwoven substrates of thermoplastic material bonded to form hexagonal cells, and having a density of less than 8 lb/ft$^3$.

2. The honeycomb of claim 1 wherein the thermoplastic material is a spunbonded polypropylene having a weight of from 2 to 3 oz/yd$^2$.

3. The honeycomb of claim 2 having a cell size of from ¼ to ½ inch.

4. The honeycomb of claim 1 wherein the thermoplastic material is a spunbonded polypropylene/polyethylene blend having a weight of 2 to 3 oz/yd$^2$.

5. The honeycomb of claim 3 having a cell size of from ¼ to ½ inch.

6. The honeycomb of claim 1 having a cell size of from 1/8 to 3/4 inch.

7. The honeycomb of claim 1 having a compressive strength of less than 25 psi.

8. The honeycomb of claim 1 having a density of from 1 to 5 lb/ft$^3$.

9. The honeycomb of claim 1 formed from a spunbonded polypropylene substrate having a weight of about 2.0 oz/yd$^2$, the honeycomb having a hexagonal cell size of 1/4 inch, a core density of about 1.8 lb/ft$^3$ and a crush strength of about 3 psi.

10. The honeycomb of claim 1 formed from a spunbonded polypropylene substrate having a weight of about 2.5 oz/yd$^2$, the honeycomb having a hexagonal cell size of 1/4 inch, a core density of about 2.1 lb/ft$^3$ and a crush strength of about 7 psi.

11. The honeycomb of claim 1 formed from a spunbonded polypropylene/polyethylene blend substrate having a weight of about 2.2 oz/yd$^2$, the honeycomb having a hexagonal cell size of 1/4 inch, a core density of about 1.9 lb/ft$^3$ and a crush strength of from about 2 to about 9 psi.

12. The honeycomb of claim 1 having a water absorbency of less than 1% by weight.

13. The honeycomb of claim 1 wherein the thermoplastic substrate has a pattern embossed on at least one surface prior to forming into said honeycomb.

14. The honeycomb of claim 1 wherein the spunbonded, thermoplastic material comprises nylon.

15. A bicycle seat comprising the honeycomb of claim 1.

16. A mattress comprising the honeycomb of claim 1.

17. A self-sustaining, lightweight, resilient, energy absorbing honeycomb having anisotropic flexing characteristics, improved shape recovery following crush, impact or squeezing, improved cushioning ability and repetitive compressibility, the honeycomb being formed from a non-elastomeric, imperforate, air permeable, nonwoven substrate of thermoplastic having a weight of from 2 to 3 oz/yd$^2$, the honeycomb having hexagonal cells of from 1/4 to 1/2 inch cell size, a density of from 1 to 3 lb/ft$^3$ and a crush strength of less than 12 psi.

18. The honeycomb of claim 17 wherein the thermoplastic substrate has a pattern embossed on at least one surface prior to forming into said honeycomb.

19. The honeycomb of claim 17 having a cell size of 1/4 inch, a density of about 1.8 lb/ft$^3$ and a crush strength of about 3 psi.

20. The honeycomb of claim 17 having a cell size of 1/4 inch, a density of about 2.1 lb/ft$^3$ and a crush strength of about 7 psi.

21. The honeycomb of claim 17 having a cell size of 1/4 inch, a density of about 1.9 lb/ft$^3$ and a crush strength of from about 2 to about 9 psi.

22. The honeycomb of claim 17 wherein the nonwoven substrate of thermoplastic is polypropylene or a blend of polypropylene and polyethylene.

23. The honeycomb of claim 17 wherein the nonwoven substrate of thermoplastic has an air permeability of from 100 to 250 cfm/sft.

* * * * *